United States Patent [19]

Hong et al.

[11] Patent Number: 5,216,514
[45] Date of Patent: Jun. 1, 1993

[54] VIDEO PRINTER AND PRINT PROCESSING DISPLAY METHOD THEREFOR INCLUDING A DISPLAYED PRINT STATUS BAR

[75] Inventors: Seong-ho Hong; Kwang-ho No, both of Suwon, Rep. of Korea

[73] Assignee: Samsung Electronics Co., Ltd., Rep. of Korea

[21] Appl. No.: 826,548

[22] Filed: Jan. 27, 1992

[30] Foreign Application Priority Data

Jan. 25, 1991 [KR] Rep. of Korea .................. 91-1292

[51] Int. Cl.⁵ .................. H04N 1/23; H04N 1/46
[52] U.S. Cl. .................. 358/296; 358/909; 358/76
[58] Field of Search .................. 358/296, 76, 75, 78, 358/450, 406, 401, 405, 439, 434, 909; 340/721; 395/101

[56] References Cited
U.S. PATENT DOCUMENTS 5,047,864 9/1991 Fujito .................. 358/296

Primary Examiner—Edward L. Coles, Sr.
Assistant Examiner—Scott A. Rogers
Attorney, Agent, or Firm—Sughrue, Mion, Zinn, Macpeak & Seas

[57] ABSTRACT

A video printer according to the present invention comprises a video processor, a printer processor, a display circuit and a control circuit. The display circuit comprises an encoder for encoding a print control signal, a bar displaying memory for generating a print processing display bar signal, a converter for converting the output of the bar display memory into an analog signal, a timing pulse generator for generating an RGB enable switching signal and bar display enable signal and a switching circuit for output of a print processing display signal to produce a flashing indication of a corresponding mode. A print processing display method is also described for storing a horizontal bar and characters, generating a printing status signal, displaying on a monitor the stored horizontal bar and characters according to the printing status signal, and flashing a corresponding function section of the bar in accordance with the current status of the print processing.

4 Claims, 5 Drawing Sheets

VIDEO PRINTER AND PRINT PROCESSING DISPLAY METHOD THEREFOR INCLUDING A DISPLAYED PRINT STATUS BAR

FIELD OF THE INVENTION

The present invention relates to a video printer and, more particularly, to a video printer wherein the status of the print processing can be displayed independent of a video picture in a video color printer with the corresponding status being indicated by flashing of a horizontal bar on a monitor. A method for operating a video printer so as to display its print processing status is also disclosed.

BACKGROUND OF THE INVENTION

Referring to FIG. 1, in a conventional video printer, a composite video signal CVS is fed to a Y/C separator B1 and is separated into luminance and color signals Y and C. A switch B2 selects between the separated Y/C signal and a superimposed video signal SVS. The Y/C signal selected by switch B2 is converted into color difference signals R-Y, B-Y and Y by a decoder B3. When a memory B6 is selected by a user using a switch B4, the color difference signals are stored in memory B6 via a line L2. During read out, the color difference signals stored in memory B6 are input to a switch B7 via a line L3. When memory B6 is not selected by the operator using switch B4, the color difference signals are directly input to switch B7 via a line L1. A decoder B8 connected to the output of switch B7 separates the color difference signals into R, G and B signals The R, G, and B signals are input to an encoder B9 and a switch B13.

Switch B13 sequentially selects the input signals according to a R, G, B printing sequence. The selected signals are converted to digital video signals by an analog-to-digital (A/D) converter B12 for storage in a line memory B14. The data stored in line memory B14 is pulse-width-converted by a thermal print head (TPH) controller B15, and the data operates a TPH B16 which performs a color printing. Yellow, magenta and cyan (Y, M, and C) colors are sequentially printed during the color image printing operation.

Meanwhile, the signals fed to encoder B9 are converted into a composite video signal. In response to the output of a monostable multivibrator B11, a switch B10 selects the output from line L4 in a no-printing portion and a video signal having a pedestal level in a printing portion so that a picture has the no-printing portion and printing portion on a monitor connected to an output terminal VSO.

A black bar is produced in the printing portion from left to right, or from right to left, so as to indicate how much of the printing has been carried out.

In the conventional video printer, during a yellow printing, the printer processing status is indicated by the black bar on the screen, while the whole picture to be printed is displayed on the remaining part of the screen. However, magenta and cyan are also printed and displayed in the same way. Therefore, it is impossible to know which color is currently being printed.

Furthermore, during printing, if the user switches the display of the monitor to view another video image, it is also impossible to know how much of the printing has been performed.

SUMMARY OF THE INVENTION

Therefore, it is an object of the present invention to provide a video printer wherein, in printing a video picture stored in a main memory, a print processing status is simultaneously displayed independent of the displayed video image to permit the user to recognize the print processing status.

Another object of the present invention to provide a print processing display method for a video printer wherein, in printing a video picture after being stored in a main memory, a print processing status is both visually displayed, to permit the user to recognize the status, and simultaneously displayed independent of the displayed video image.

To accomplish these objects, the video printer of the present invention comprises a video processor for processing an input video signal to store one still picture in a memory and selectively output the video signal and the one still picture stored in the memory, a printer circuit for receiving the output of the video processor to be converted into a digital video signal and color-printing the digital video signal, a print processing display circuit for responding to a present print proceeding of the printer circuit to mix the output from the video processor and a print processing indicating signal and outputting the result, and a controller for controlling the respective circuits according to each control mode, wherein the monitoring circuit comprises an encoder for converting the signal supplied from the video processor into a composite video signal, print processing indicating circuit for generating signals which indicate a print operation processing state an outputting the result, a monostable multivibrator for vibrating a predetermined clock signal and outputting the result, and switching circuit for receiving the composite video signal from the encoder and a print processing indicating signal from the print processing indicating circuit, and for selectively outputting a monitoring signal for a monitor according to a control signal from the monostable multivibrator.

The print processing display method for a video printer, which stores one still picture of input video signals in a memory, selectively prints the stored one still picture and the input video signal and outputs the one still picture or the input video signal to a monitor, comprises the steps of outputting the still picture corresponding to a print processing operation to the monitor, simultaneously outputting a bar indicating signal indicating the print processing state on a predetermined region of the monitor screen when printing the stored still picture, and flashing an indicating portion corresponding to a current print processing mode of the bar indicating signal to display the print processing state on the monitor independent of the video signal.

BRIEF DESCRIPTION OF THE DRAWINGS

The above objects and other advantages of the present invention will become more apparent by describing in detail a preferred embodiment of the present invention with reference to the attached drawings in which like elements are indicated throughout by like or similar numbers, and in which.

DETAILED DESCRIPTION OF THE INVENTION

Figure 1:
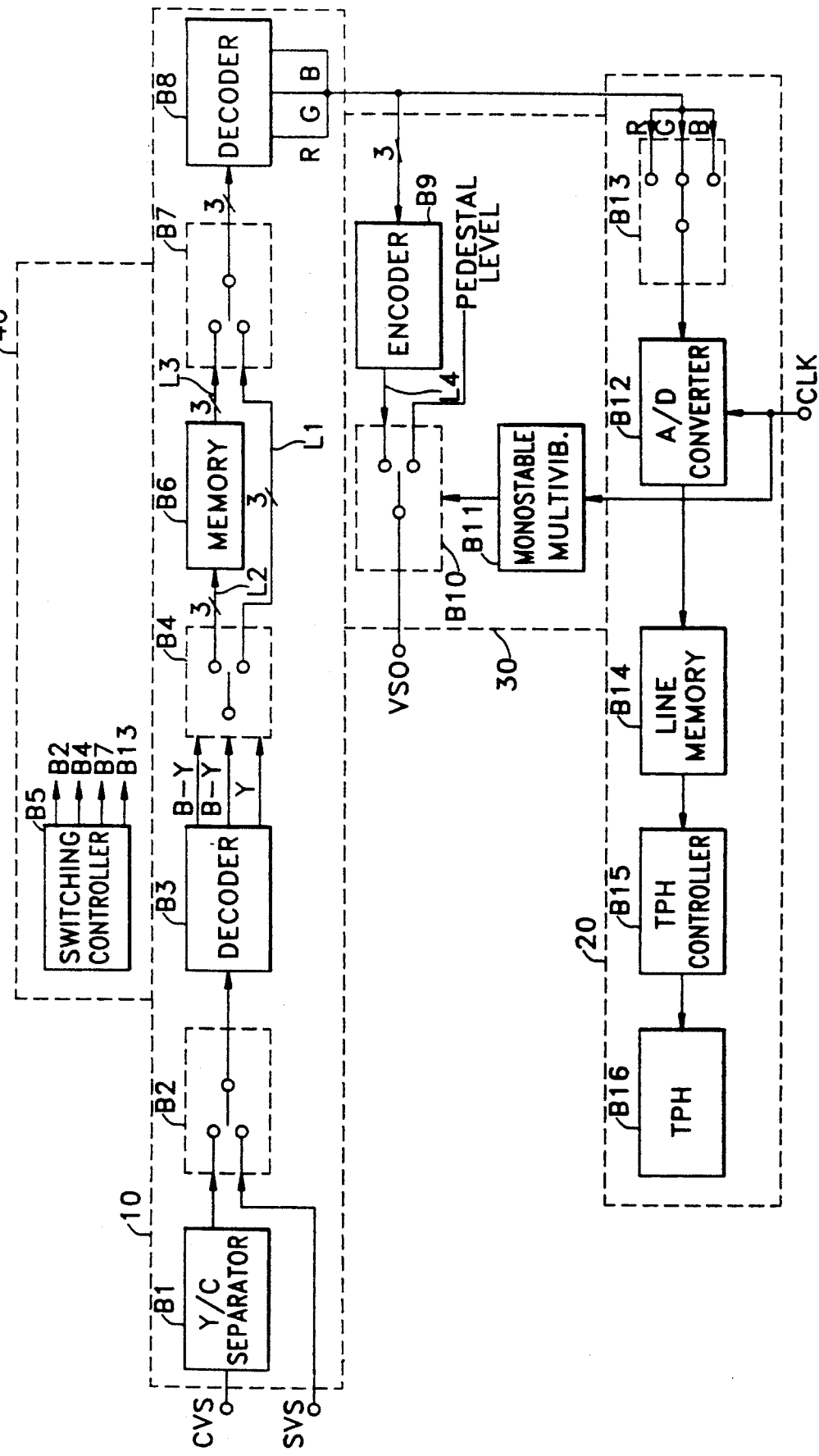
FIG. 1 is a block diagram of a conventional video printer.
Figure 2:
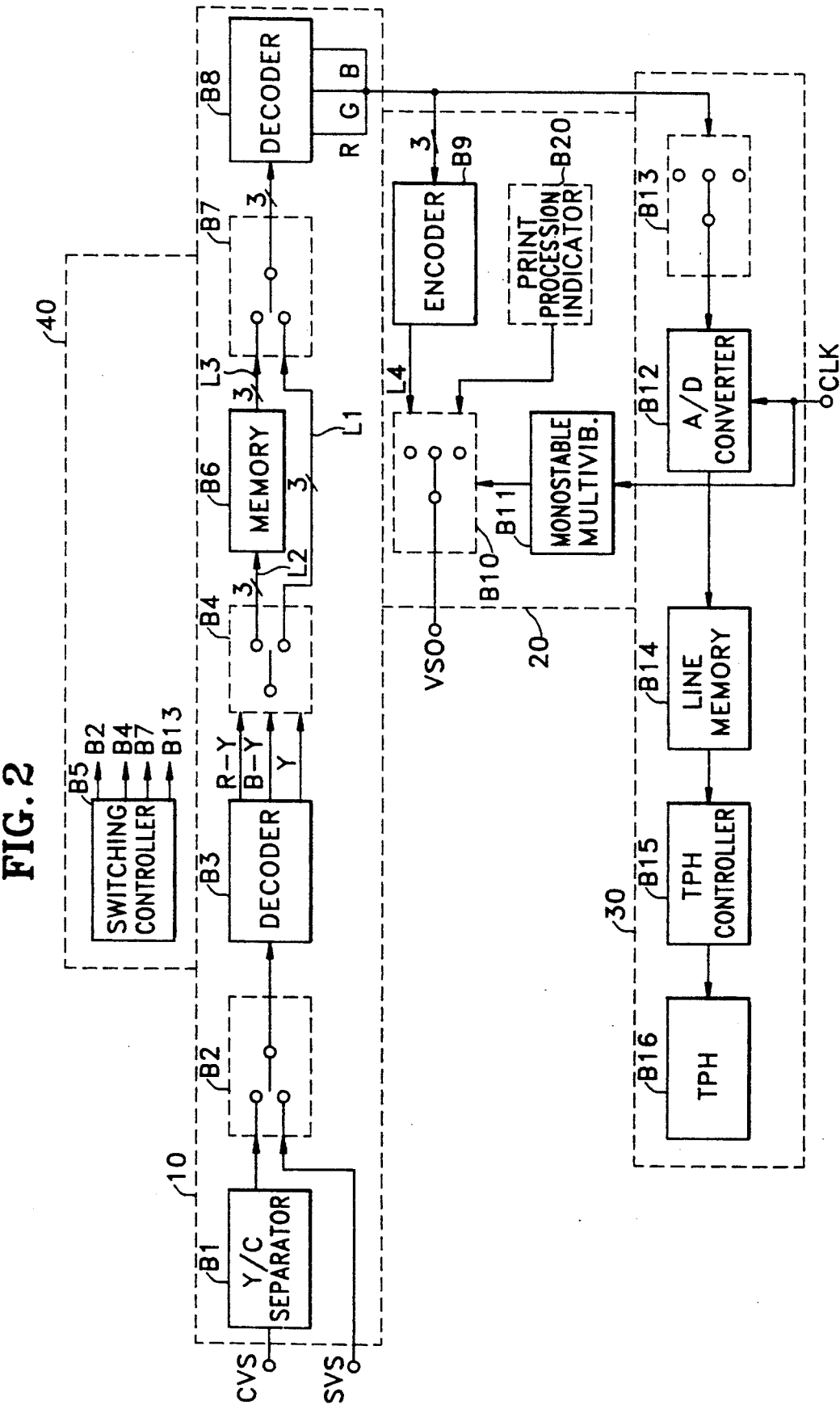
FIG. 2 is a block diagram of a video printer according to the present invention.

The video printer shown in FIG. 2 consists of a video processor 10, a printer circuit 30, a monitor display circuit 20 and a controller 40. In FIG. 2, like elements are numbered with the numbers of corresponding elements in FIG. 1. It will be appreciated that one of the differences between FIGS. 1 and 2 is that a print processing indicator B20 is provided instead of the pedestal level in monitor display circuit 30.

Figure 3:
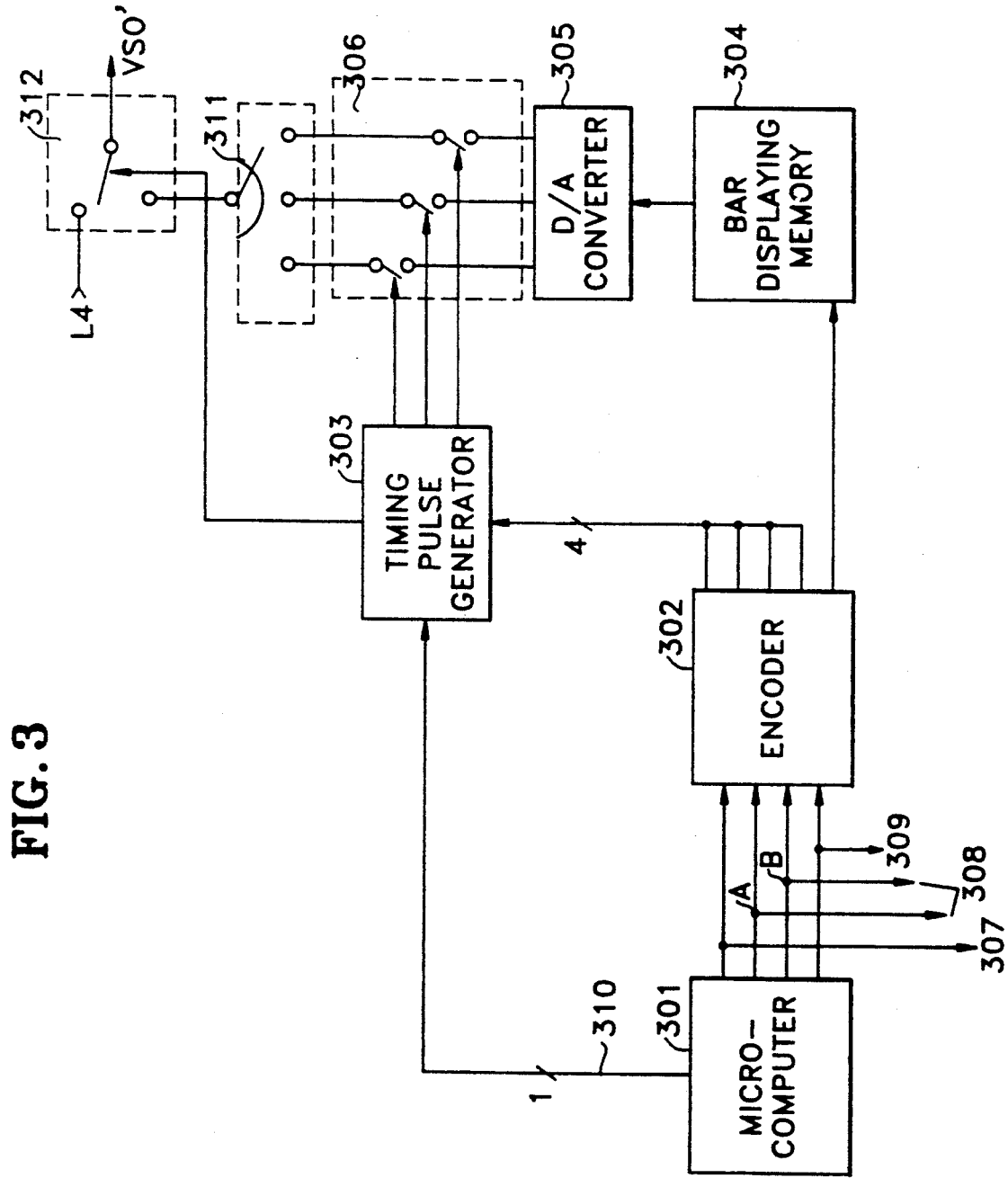
FIG. 3 is a block diagram of the print processing indicator of FIG. 2.
Figure 4:
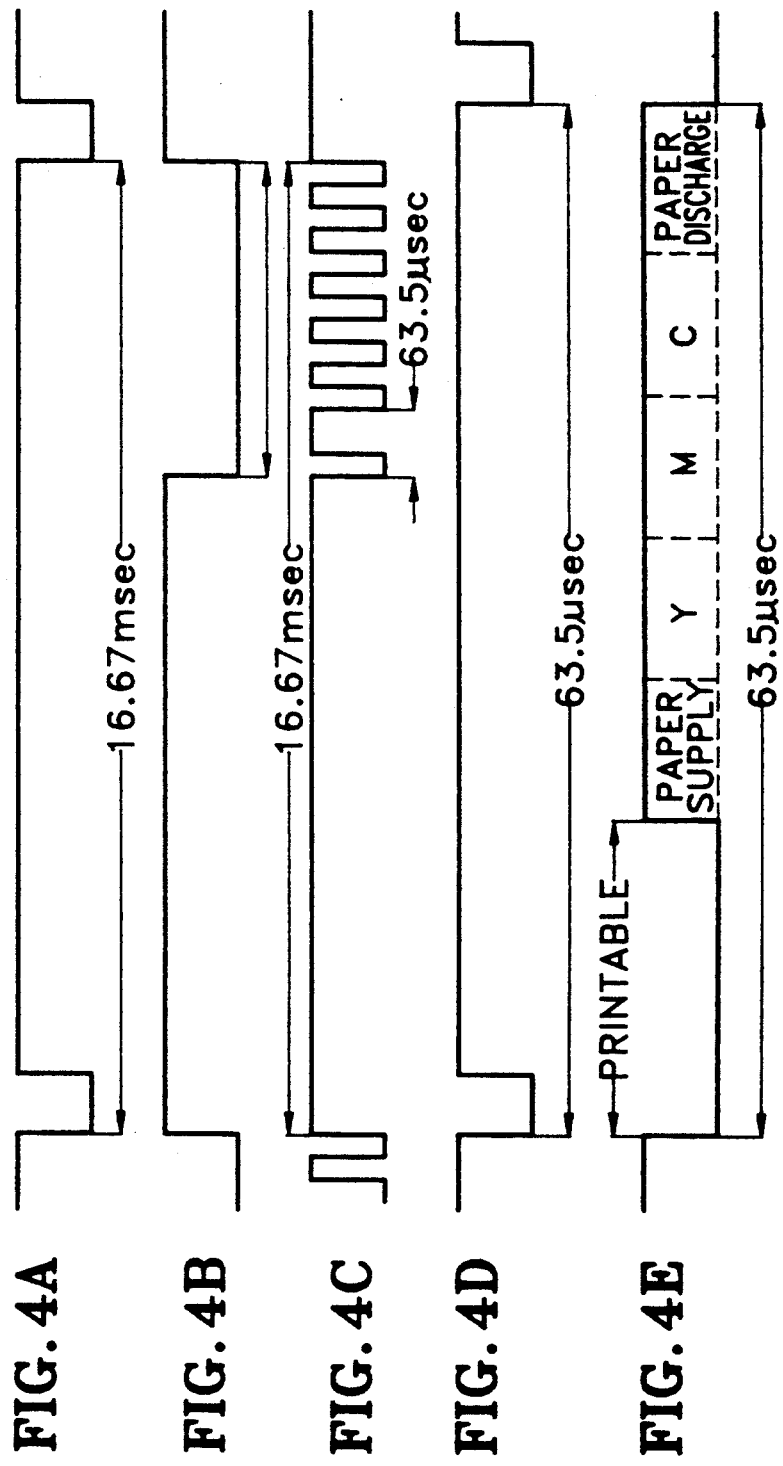
FIGS. 4A to 4E are waveform diagrams which are used in explaining the operation of print processing indicator of FIG. 3.

Referring to FIG. 3, print processing indicator B20 comprises a microcomputer 301 for generating a control signal according to each control mode, an encoder 302 for encoding print and TPH control signals 307 and 309, respectively, and a Y, M and C select signal 308, a bar displaying memory 304 chip-enabled by the output signal from encoder 302, for generating serial printable, paper supply, Y, M and C print, and paper discharge indication bar signals, a D/A converter 305 for converting the output signal from bar displaying memory 304 into an analog signal, a timing pulse generator 303 for generating the switching signals for a switch 312 and an RGB enable switch 306 controlled in response to the output signals from encoder 302 and microcomputer 301. Preferably, RGB enable switch 306 switches the output signal from D/A converter 305 according to the output from timing pulse generator 303 to flash a corresponding mode. A switch 311 for sequentially supplying the R, G, and B outputs from RGB enable switch 306 to switch 312 advantageously is included in print processing indicator B20.

FIGS. 4A to 4E show waveforms which are used to explain the operation of FIG. 3 according to the present invention.

FIG. 4A shows a waveform of a horizontal synchronous signal. FIG. 4B is a waveform of a bar enable signal generated from timing pulse generator 303. FIG. 4C in a waveform of a flash enable signal of RGB enable switching circuit 306 generated from timing pulse generator 303. FIG. 4D is a waveform of a horizontal synchronous signal for a monitor. FIG. 4E is a waveform of a flash signal corresponding to functions displayed on the monitor.

Figure 5:
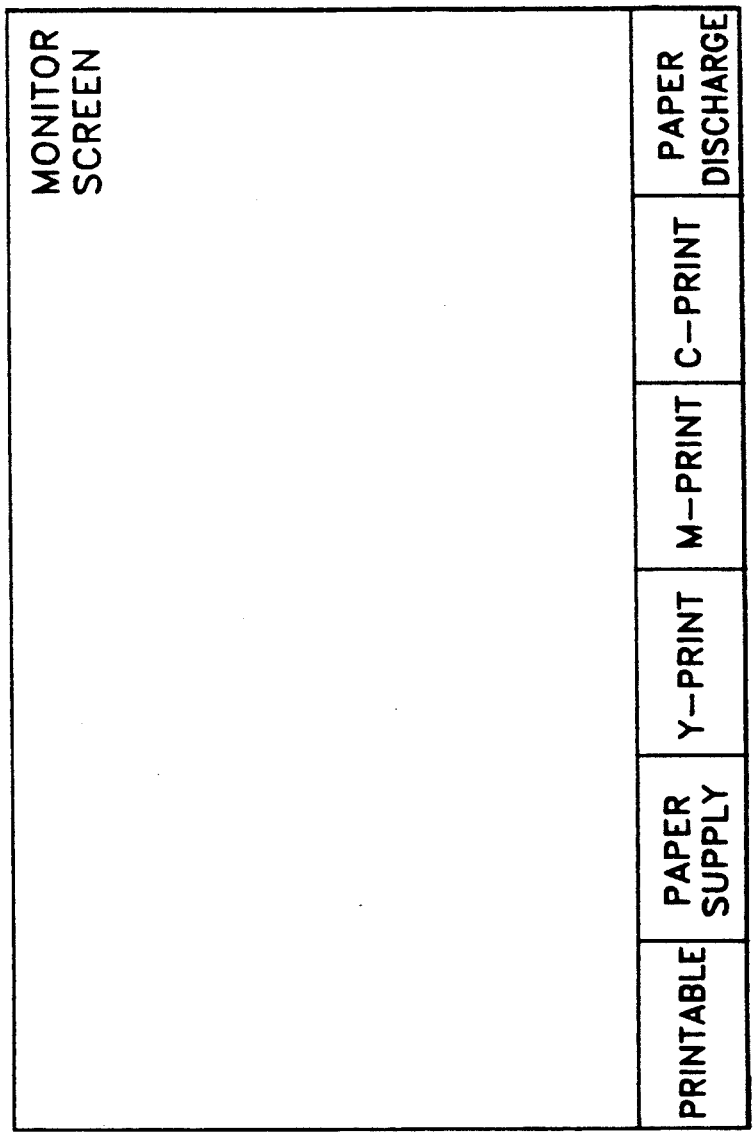
FIG. 5 shows the condition of the monitor screen of the video printer according to the present invention.

FIG. 5 illustrates the condition of the monitor screen according to the present invention.

Now, one embodiment of the present invention will be described below in detail with reference to FIGS. 2 to 5.

Referring to FIG. 3, during color video printing, microcomputer 301 generates print, TPH control and Y, M and C select signals 307, 309 and 308 to be encoded by encoder 302. The output from encoder 302 chip-enables bar displaying memory 304 which then generates a print processing indicating bar signal and feeds it to D/A converter 305. When the signal is converted into an analog signal by D/A converter 305 and is input to RGB enable switch 306, timing pulse generator 303 decodes the signals output from encoder 302 and the signal 310 output from microcomputer 301 to turn RGB enable switch 306 on and off according to a print processing state by the flash enable signal as shown in FIG. 4C, and to turn on and off switch B10 of FIG. 2 by the bar enable signal as shown in FIG. 4B. The video signals output from D/A converter 305 via RGB enable switch 306, a switch 311, switch 312 and switch B10 of FIG. 2 are flashed at output terminal VSO as shown in FIG. 4E to indicate a corresponding function state according to the horizontal synchronous signal of FIG. 4D on the monitor screen of FIG. 5.

The input and output of timing pulse generator 303 will be described in detail with reference to TABLE 1.

TABLE 1

| MODE INPUT | PRINT-ABLE | PAPER SUPPLY | Y | M | C | PAPER DIS-CHARGE |
|---|---|---|---|---|---|---|
| PRINTABLE Y, M, C SELECTION | 1 | 1 | 1 | 1 | 1 | 0 |
| A | 0 | 0 | 1 | 0 | 1 | 0 |
| B | 0 | 0 | 0 | 1 | 1 | 0 |
| PRINT ENABLE | 0 | 0 | 1 | 1 | 1 | 0 |
| MICRO-COMPUTER CONTROL PORT | 0 | 1 | 1 | 1 | 1 | 0 |

R, G, and B signals decoded by decoder B8 of FIG. 2 are encoded by encoder B9, input to switch B10 of FIG. 2 via line L4, and displayed on the monitor via video signal output terminal VSO.

After the color video printer sets an initial state, the microcomputer 301 shown in FIG. 3 generates a print-ready signal.

The signal is encoded by encoder 302 which generates a chip-enable signal for bar displaying memory 304. The signal is also applied to timing pulse generator 303 to turn on switch B10 of FIG. 2. Print processing indicating bar data is generated from bar displaying memory 304 and converted into an analog signal by D/A converter 305. The analog bar signal is output to video signal output terminal VSO via RGB enable switch 306, switch 311, switch 312 and switch B10 of FIG. 2. As shown in FIG. 5, the output signal is displayed on the bottom of the monitor as per the signal of FIG. 4E and according to the signal of FIG. 4D.

It will be noted that in indicating a print waiting state (the "PRINTABLE" section of FIG. 4E), timing pulse generator 303 turns on and off RGB enable switch 306 to flash the bar. At this time, in response to the input, microcomputer 301 drives a paper supplying motor (not shown) to supply paper. As the sequence of the paper supply state is 1, 0, 0, 0 and 1, as shown in TABLE 1, timing pulse generator 303 turns on and off RGB enable switch 306 to flash the paper supply section of the bar of FIG. 5. It will be appreciated from the logic of TABLE 1, microcomputer 301 also generates logic data about the Y, M and C print and paper discharge functions. The data is encoded and timing pulse generator 303 turns on and off RGB enable switch 306 to flash a corresponding function section of the monitor bar of FIG. 5 in response to operations including Y, M and C print and paper discharge so that the user is able to recognize the corresponding functions.

After paper discharge, the bar of FIG. 5 disappears until the printer is prepared for the next printing operation, at which time it is redisplayed on the monitor as shown in FIG. 5 to indicate the printer ready state.

Two display image types, i.e., a stored picture and the direct output from a video signal input, may be displayed on the monitor. In any case, to indicate the print processing status, a switch for switching to the bar displaying memory is added to a memory picture/source picture (a picture formed directly from the video signal input) switch. The switching to the bar displaying memory is made possible by generating the bar enable signal shown in FIG. 4B.

Although the bar is displayed on the bottom of the screen in FIG. 5, it will be apparent that the bar may be displayed anywhere on the screen by freely changing its timing.

As described in detail above, the video printer and the print processing display method of the present invention 10 enables a user to view the print processing status, and displays the status independent of the displayed video image.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A video printer comprising:
   video processor means for processing an input video signal to store one still picture in a memory and selectively generating an output from one of the input video signal and the one still picture stored in said memory;
   printer means for receiving the output of said video processor means to be converted into a digital video signal and color printing the digital video signal;
   print processing display means for mixing the output from said video processor with an analog print processing indicating signal in response to a current status of print processing of said printer means, and outputting the result; and
   controller means for controlling said video processor means, printer means and print processing display means according to each of a plurality of control modes;
   wherein said print processing display means comprises:
   an encoder for converting the video signal supplied from said video processor means into a composite video signal;
   print processing indicating means for generating and outputting said analog print processing indicating signal which indicates a print operation processing state;
   a monostable multivibrator vibrating at a predetermined clock signal for outputting a resultant signal; and
   switching means for receiving the composite video signal from said encoder and said analog print processing indicating signal from said print processing indicating means, and for selectively outputting a monitoring signal for a monitor according to said resultant signal from said monostable multivibrator, wherein said print processing indicating means comprises: 'a microcomputer for generating control signals according to respective ones of said control modes;
   a second encoder for encoding a print control signal generated by said microcomputer;
   a bar displaying memory enabled by an output signal from said second encoder for generating a digital print-processing-indicating signal;
   a D/A converter for analog-converting the digital print processing indicating signal output by said bar displaying memory;
   a timing pulse generator for generating a RGB enable switching signal and a bar displaying enable signal according to a second output signal from said second encoder and a monitor display control signal from said microcomputer; and
   a switching circuit for switching the output signal from said D/A converter according to the RGB enable switching signal from said timing pulse generator to output said analog print processing indicating signal which flashes at a corresponding one of said control modes.

2. A video printer as claimed in claim 1 wherein said print operation processing state designates a present color being printed by said printer means.

3. A video printer comprising:
   video processor means for processing an input video signal to store one still picture in a memory and for selectively supplying an output corresponding to a selected one of said input video signal and the one still picture stored in said memory;
   printer control means receiving the output of said video processor means for converting the video signal to a digital video signal so as to permit color printing of said output;
   print processing display means for mixing the output from said video processor means with a print processing indicating signal in response to a current status of print processing of said printer control means to provide a resultant output signal; and
   controller means for controlling said video processor, said printer control and said print processing display means according to each of a plurality of control modes;
   wherein said print processing display means comprises:
   an encoder for converting the output supplied from said video processor means into a composite video signal;
   print processing indicating means for generating and outputting said print processing indicating signal corresponding to a current print processing state; and
   switching means operatively connected to said encoder and said print processing indicating means for receiving the composite video signal and said print processing indicating signal, respectively, and for selectively outputting a signal corresponding to a monitor drive signal in response to a predetermined control signal, wherein said print processing indicating means comprises:
   a bar displaying memory for generating digital data corresponding to said current print processing state;
   a converter for generating said print processing indicating signal from said digital data output from said bar displaying memory; and
   a switching circuit for switching said print processing indicating signal in response to a second predetermined control signal to output said print processing indicating signal so as to permit a predetermined section of said print processing indicating signal to flash during a corresponding one of said operating modes.

4. A print processing display method of the type which stores a still picture of an input video signal into a memory of a video printer, selectively prints said stored still picture of said input video signal, and outputs a selected one of the one still picture and the input video signal as a monitor video signal to a monitor; said print processing display method for said video printer comprising the steps of:

outputting the still picture corresponding to a print processing to said monitor;

simultaneously outputting a bar indicating signal indicating a print processing state to form a bar image on a predetermined region of a screen of the monitor when printing said stored still picture; and flashing portion of said bar image corresponding to a current print processing mode in the bar indicating signal to display the print processing state on said monitor independent of said monitor video signal.

* * * * *